United States Patent [19]
Antonelli

[11] 3,892,103
[45] July 1, 1975

[54] LIQUEFYING REFRIGERANT FOR WATER DESALINATION WITH LIQUEFIED NATURAL GAS AND AN INTERMEDIATE ENERGY CYCLE

[75] Inventor: Attilio Antonelli, Florence, Italy

[73] Assignee: Nuovo Pignone, S.p.A., San Donato Milanese, Italy

[22] Filed: June 12, 1973

[21] Appl. No.: 369,185

[30] Foreign Application Priority Data
June 13, 1972 Italy.............................. 25580/72
July 13, 1972 Italy.............................. 26927/72
Jan. 30, 1973 Italy.............................. 19770/73

[52] U.S. Cl........................... 62/58; 62/52; 62/40; 60/648
[51] Int. Cl............................................. B01d 9/04
[58] Field of Search....................... 62/58; 51; 52

[56] References Cited
UNITED STATES PATENTS

| | | | |
|---|---|---|---|
| 2,964,917 | 12/1960 | Webster | 62/51 |
| 3,204,419 | 9/1965 | Rose | 62/58 |
| 3,535,210 | 10/1970 | Linde et al. | 62/52 |
| 3,630,042 | 12/1971 | Petsinger | 62/58 |
| 3,675,436 | 7/1972 | Ganiaris | 62/58 |
| 3,724,229 | 4/1973 | Seliber | 62/58 |

*Primary Examiner*—Norman Yudkoff
*Assistant Examiner*—S. J. Emery
*Attorney, Agent, or Firm*—Ralph M. Watson, Esq.

[57] ABSTRACT

Desalted water is produced through a process in which liquified natural gas is converted to the vapor state with the release therefrom of refrigeration units which are transferred, through a closed refrigerant fluid circuit, to a higher hydrocarbon in the vapor state, which hydrocarbon is converted to the liquid state and delivers to the water to be desalted, in a desalination plant, the refrigeration units necessary for desalination. The closed refrigerant fluid circuit includes a heat exchanger for the absorption of refrigeration units from the liquified natural gas, a boiler for the absorption of heat from the higher hydrocarbons, a superheater for the transfer of heat from a source such as water to the refrigerant fluid, and a turbine through which energy in the heated refrigerant fluid may be delivered to a compressor for the higher hydrocarbon.

10 Claims, 3 Drawing Figures

FIG. 1

LIQUEFYING REFRIGERANT FOR WATER DESALINATION WITH LIQUEFIED NATURAL GAS AND AN INTERMEDIATE ENERGY CYCLE

The principle of the heat multiplier is the basis of numerous applications which have been made and, in the past, gave rise to some patents.

A new utilization of this principle is shown in the present invention; it will be explained schemitically to make clearer the system proposed for its application. When heat passes from a higher temperature level (level 1) to a lower one (level 0), it is always possible, by known means, to obtain mechanical energy.

The known means are employed in thermal power stations for the production of energy. By making use of the energy so obtained in order to operate a suitable plant it is also possible, with known means, to cause heat to pass from level 1 to a higher temperature level 2. The known means are the ones used in a common refrigerating plant, working according to a vapour compression system.

Thus it is possible to remove heat from temperature level 1 in two ways: with the energy generator plant and with the refrigerating plant operated by said energy.

The heat withdrawn at level 1 is multiplied by the one which may be withdrawn either by means of the single refrigerating plant or by means of the single energy generator.

The temperature level 2 is normally ambient temperature.

Temperature level 1 is the one to which one has to withdraw heat for a definite purpose. The 0 temperature level is the lowest of all and when it is available, allows the multiplication of the heat which is to be removed from level 1.

The invention described in the present application may utilize, as level 0, the liquid methane or liquefied natural gas coming from countries rich in crude oil.

As far as level 1 is concerned, it is fixed in connection with the desired use by the temperature, generally lower than the room temperature, which may be obtained.

The invention which is the subject of the present application, withdraws to level 1 the highest possible amount of heat to reduce noticeably, and even to annul, the use of the energy which it is necessary to use in the desalination plants of the sea or brackish waters, making use of the cold.

Therefore it is proposed to install the desalination plant in proximity to a LNG gasification plant coming from overseas. (LNG signifies liquid natural gas).

The present invention relates to desalination plants operating by the freezing in part of the brackish water by means of direct injection of liquid n-butane into the same.

In this plant, in most cases, there are two compressors making part of a refrigerating plant, which assures the continuous supply of liquid n-butane, to the water freezer. A certain consumption of electric energy is required to operate said compressors. If the dissolution plant is associated with a collecting and gasification plant of LNG, it is possible also to suppress any consumption of electric energy by producing desalted water and at the same time by gasifying the LNG without it being necessary, for this last effect, to consume large amounts of vapor or, alternatively, to put into circulation a large amount of sea water which is returned to the ambient noticeably cooled.

The plant scheme of the present invention relates to one of the different treatments to which the LNG may be subjected.

It relates to the hypercritical vaporization of LNG, when the vaporized LNG is to be introduced into a methane pipeline network at 60 atmospheres; in such a case LNG is pumped, by means of suitable centrifugal pumps at the pressure of 63–64 atm. inside the gasification plants, at the outlet of the which, the natural gas, brought to a temperature near to that of the ambient, may be injected in the methane pipe line.

In another case it may be interesting to have the natural gas at lower pressure, for example 12 or 30 atm. for the distribution to an network of a iron and steel industry or of a chemical plant; and in such a case in a zone of the gasification apparatus the LNG boils at low temperature and is subsequently overheated to room temperature.

This different case requires variants in the apparatus but also permits the application of heat multiplication to reduce or to annul the energy consumption necessary to desalt the sea water.

The above mentioned first case, to which the scheme of the present invention corresponds, has been calculated with reference to the heating curve of a definite LNG and a study has shown that it is possible to produce a noticeable amount of desalted water without the supply of electrical energy other than that necessary for operating the feeding pumps of the energy generator plant. (Obviously a little reduction in the finished product i.e. in the produced fresh water, allows also the elimination of such supply of electrical energy from the outside).

In certain circumstances it might be interesting to produce more desalted water, with a supply of outside electrical energy.

This may be done by making use of a compressor larger than one which is operated by the generated mechanical energy, by connecting a suitable electrical motor on the compressor axis, with the interposition of a revolutions multiplier.

Another way to produce a higher amount of desalted water may be that of utilizing a waste heat, also at a very low temperature level which excludes any other use, in order to overheat even more the vapour which is sent to the power engines to produce the energy necessary for the plant.

By means of overheating, in case of interstage heating, it is known that a higher power supply to the power engines is obtained and therefore also to the refrigerator and consequently the weight of the produced desalted water increases.

Such a plant is described with reference to the scheme illustrated in FIG. 1 of the accompanying drawings giving some results of calculations.

The n-butane coming from the desalination plant goes into A in the vapour state, comes out at B liquid state and is directed to the desalination plant. The condensation occurs at +1°C and is effected in five different apparatuses: the three boilers of the energy generating plants $C_1$, $C_2$, $C_3$; the evaporator E of the refrigerating plant; the exchanger $S_4$ which utilizes the thermal gradient still available as to the LNG which is going out from the plant.

The energy generating groups are three in number and the relative turbines are marked by I, II, III. (P indicates the pumps).

Group IV represents the refrigerating system.

It does not matter what the number of groups may be so far as the particular application is concerned.

It is obvious that, by increasing the plants, the heat exchange in $S_1$, $S_2$ and $S_3$ will occur with lower temperature gradients and the lesser increase of entropy will result in a higher yield.

The operating fluid, for example a Freon, in group I condenses in $S_1$ and, at the same time, the LNG undergoes an increase of temperature. The liquid Freon is pumped up to the pressure of boiler $C_1$, where for the first time it gets warm and then vaporizes.

The n-butane vapour is the heating agent; this condenses entirely and returns to the desalination.

The Freon is overheated some degrees by a hot water circuit, which, in its turn, becomes cold.

The overheated vapour of Freon then enters the inlet of turbine I. The energy generating groups II and III operate in a similar way. However it is to be noticed that the condensation temperature in $S_2$ is higher than in $S_1$ and this temperature in $S_3$ is higher than in $S_2$. This is obvious, because the refrigerating agent LNG is progressively heating. As a matter of fact it enters C in the liquid state and goes out at D at vapour state.

Consequently, the temperature and pressure at the inlet of the turbines being unchanged, the efficiency of the energy generating groups is decreasing from I to III.

The power generated by three turbines may be applied to a single shaft and utilized on a centrifugal compressor of a normal refrigerating plant, for example Freon or $NH_3$ (F).

In the evaporator E of the refrigerating plant the condensation of another quantity of vapours of n-butane coming from the desalination occurs.

In condenser K of the refrigerating plant, the sea water is heated some degrees. A portion of this hot water overheats the Freon of the energy generating plants in heat exchangers $Su_1$, $Su_2$, $Su_3$. By way of unrestrictive example, with reference to the availability of $10^9$ Nm$^3$/year of LNG, the following calculated results have been obtained:

The available LNG has been calculated in 80 ton/d, entering at −160°C and emerging at −4°C.

Between these limits of temperature the LNG subtracts 16.000 · 10$^6$ Cal/h. The power obtained by the turbines is:

| I) | 1161 | actual kw to the shaft |
| II) | 725 | " |
| III) | 496 | " |
| | 2382 | " |

The pressure and temperature of admission to the turbines is 18.15 (ata) and +20(°C).

The condensation is respectively at:
I. −118°C
II. −73°C
III. −28°C

The amount of heat subtracted to n-butane in the boiler sums up to 16.02 · 10$^6$ Cal/h.

The refrigerator has a capacity of 11.50 · 10$^6$ Cal/h. The exchanger $S_4$ subtracts to n-butane 1.855 · 10$^6$ Cal/h. In total we have: 29.375 · 10$^6$ Cal/h.

Which are subtracted to n-butane which condenses at the temperature of +1°C.

Therefore the weight of the condensate is about: 316 |t/n| of n-butane.

From this datum, by knowing the efficiency with which the cold is used in the desalination plant, one derives the amount (ton/day) of fresh water which it is possible to produce.

This figure, as above mentioned, has refrence to an availability of 10$^9$ (Nm$^3$/year) of LNG.

We have also calculated the effect of an increase of the pressure in the boiler and of a higher overheating temperature of the Freon operating in the energy generating groups.

By bringing the pressure in the boiler to 40 ata and the overheating to 67°C one derives an increase of about 65% in the production of the condensed n-butane.

As before mentioned, for this purpose there may be used coal or vapour wastes which would not find different utilization.

It is evident that in the particular case of desalination plant by injection of n-butane, the above mentioned utilization of the cold of LNG implies the suppression of the primary compressor of n-butane as well as the suppression of various apparatuses (condensation of primary n-butane, secondary compression of n-butane and its condenser and so on).

It is also evident that the defrosting of the ice, obtained from the water may be done, instead of at the expenses of the n-butane condensation, by circulation of hot water coming from the condenser of the refrigerating plant or of sea water.

The present invention has been described with particular reference to the use of n-butane, but this may be replaced by any other hydrocarbon than LNG; in such a way, for example, there may be utilized propane, the isobutane or mixtures of them, as well as, for example, cuts of $C_3$–$C_5$.

The process described above may be subjected to many variants having the aim of the best possible exploitation of the low temperature possessed by GNL.

Figure 1:
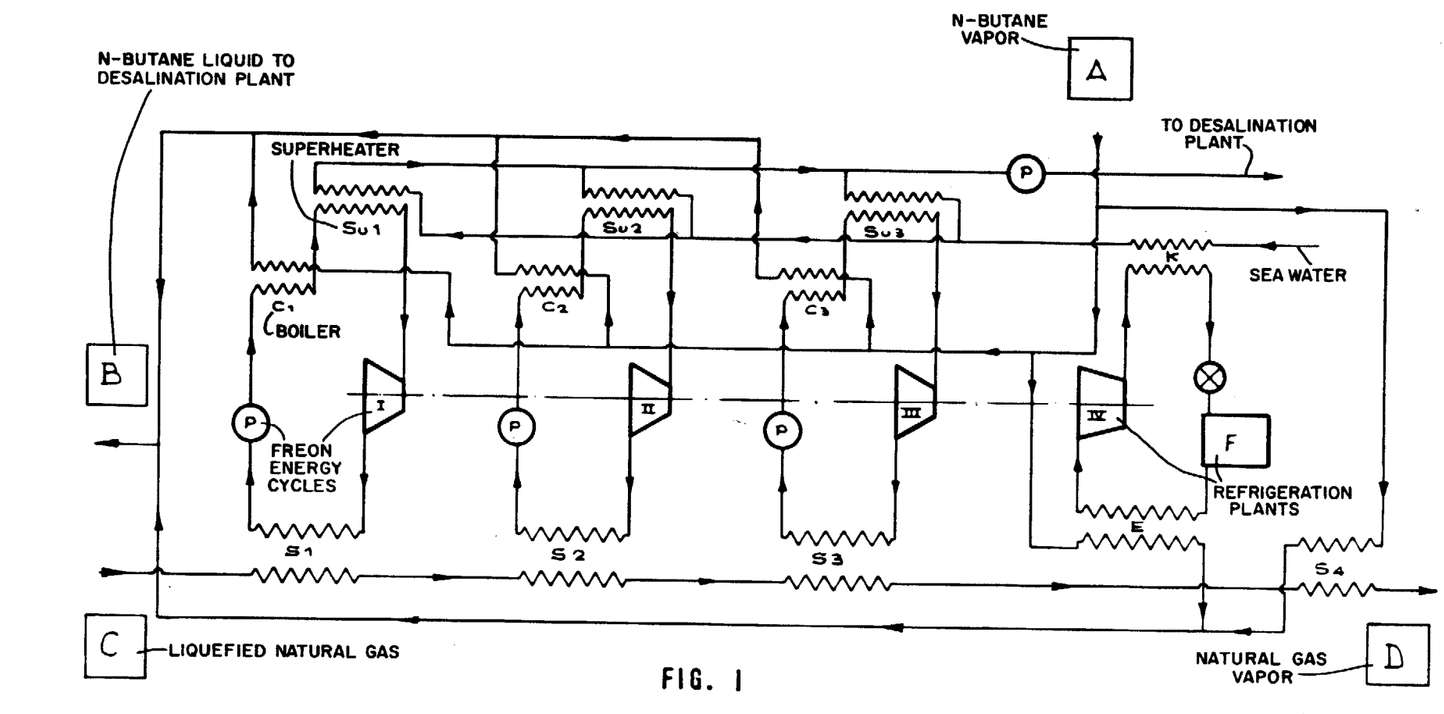
FIG. 1 is a flow diagram of one system of apparatus through which a process of my invention may be carried out.

We have already mentioned the advantage in this sense arising from the use of many energy generating plants, which are three in member in the scheme of FIG. 1.

Other provisions which make easier the production of liquid n-butane (and consequently of desalted water) are herewith illustrated.

As above described, we have provided a process for the desalination of sea water comprising the transfer of refrigerating units from an hydrocarbon LNG (liquified natural gas) passing from liquid to vapour phase to another hydrocarbon, for example propane, passing, on the contrary, from the vapour to liquid phase. This second hydrocarbon, by evaporation, supplied the refrigerating units necessary for the freezing of sea water, returning in such a way the hydrocarbon to the vapour state and being sent again in the above described cycle. The transfer of the refrigerating units from LNG to the butane took place by means of one or more closed refrigerating circuits, operating with refrigerant liquids such as Freon or ammonia or other liquids. According to what has been described, said refrigerating circuits exchanged only with LNG and with the butane. Now we foresee a variant of easy execution which improves noticeably the carrying out of the cycle.

As a matter of fact, we foresee one or more closed circuits having refrigerant liquid which, besides exchanging with LNG and butane, exchange also among themselves. Such exchange is preferably realized in co-current (parallel current).

It is also foreseen, that such circuits exchange thermally, besides among themselves, also with waters circulating in the plant or which may be found in it, said waters having a suitable thermal content for the exchange.

These exchanges may be in counter-current. For this purpose use may be made of sea water and/or fresh waters derived from partial or total fusion of the formed ice and the like.

A further additional variant is when the process of the invention requires that at least one of the closed circuits exchanges in at least one point in parallel current with the hydrocarbon which transfers refrigerating units by passing from the liquid phase to the gaseous phase.

The efficiency of the refrigerating plants, as it is known, increases rapidly with decreases in the difference of temperature between condenser and evaporator of the refrigerating fluid.

Therefore, it is advantageous to increase, in the refrigerating plant, (operated by the energy obtained by means of generating plants), the evaporation temperature to 0°C or +0.5°C and to lower the condensation temperature.

The last effect is attainable on account of the fact that in the desalination plant based on injection of liquid n-butane it is necessary, at a certain point, to melt the water ice formed in the crystallizer.

As the vapour of n-butane, which comes out from this apparatus, condenses in the boilers of the generating plants, according to the scheme proposed by us, it is no longer available for the melter of the ice. The melting heat brought to the melter by the vapour of n-butane is replaced, in direct or indirect circulation, by the heat which the refrigerating plant brings to the condenser. The water which carries the crystals to be defrosted crosses the condenser and, therefore keeps, the condensation temperature low while, at the same time, the water crystals melt.

The requirement of cold water to the condenser of the refrigerating plant is surely covered, it is sufficient to consider that a major part of the formed ice derives from the liquified n-butane not in the refrigerating plant, but in the generating plants.

It is even necessary to let sea water circulate in the melter to effect the entire melting of the ice. At the same time the sea water which goes to the freezing is pre-cooled.

By considering at +1°C the water coming out from the melter and at +5°C the water (heated in the condenser) which returns to it, it may be forseen in general, that the condensation occurs at +9°C.

Under these conditions the efficiency tables of the freezing cycles bring to an efficiency of 19.600 (Cal.)/KW.e. quite unusual for the normal refrigerating plants.

By making suitable calculations it appears that with 448 (KW.e.) to the compressor shaft, the efficiency is of 8.78 millions of calories/h withdrawn to the condenser of n-butane operated by the freezer.

As the generating plants produce 2530 KW e., having been brought to 0°C the evaporation of Freon 13 in the boiler, the remaining 2082 KW.e. represent what is necessary to compress the n-butane developed in the crystallizer from its pressure (about 0.846 ata) to the one of condensation at +2.5°C in the boilers of the generating plants. A further increase in the production of liquid n-butane is obtained by making use of the low temperature in:

Freon 13 of supply for the boilers of the generating plants I° II° and III°.

LNG coming out from the condenser of plant III with the temperature of −33°C.

This utilization is made as follows:

The evaporator of the refrigerator produces $NH_3$ vapours, but it operates better by making use of the Freon 13 (also because of the uniformity with the fluid working in the generating plants) at 0° and relative saturation pressure.

Portion of those vapours go the suction of the turbocompressor and follow the usual cycle of a common refrigerating plant.

Other portion of said vapours under the same pressure obviously are condensed if brought on surfaces much more cold than +0°C.

They may be guided on:

The pre-heaters after the feeding pump of liquid Freon 13 of the three generating plants;

An exchanger arranged on LNG coming out from the condenser of the III° generating plant. As a matter of fact the LNG comes out at −33°C and may heat up to −4°C.

The cooling and relative condensation of Freon 13 occurs in parallel current in the above-mentioned exchangers in order to have, at the outlet of the liquified Freon 13, a temperature of about 0°C, without overcoolings which might cause troubles in the condensers of n-butane subsequently run by Freon 13.

The collected liquid is sent by means of pumps, downstream the throttling cock of the refrigerating plant (IV), i.e. it is mixed with Freon 13 coming from the condenser of the plant itself.

The condensation of Freon 13, in such a way obtainable, corresponds to $8.31 \cdot 10^6$ (Cal/h).

In total, the availability of calories which is possible to withdraw to n-butane coming from the crystallizer, at the vapour state, is:

| | |
|---|---|
| From the boilers of the generating plants: | $9.60 \cdot 10^6$ $\left(\frac{Cal}{h}\right)$ |
| From the refrigerating plant | $8.78 \cdot 10^6$ |
| From the exchangers on the supply of the boilers and LNG: | $\cdot 10^6$ |
| Total | $26.69 \cdot 10^6$ $\left(\frac{Cal}{h}\right)$ |

By to condensing n-butane at +2.5°C and therefore at the pressure of 1.161 ata, the latent heat of vaporization is about 91.5 (Cal/Kp) whereby in total 292,000 (Kp/h) of n-butane are condensed. It is still to be noted that there is yet available some cold in the liquid Freon 13 of supply of the boilers, because in said exchangers having parallel current with vapours of Freon 13, it will be possible to heat the liquid which feeds the boilers up to −5°C.

Therefore it is suitable to provide another little exchanger, for example of sea water (which has to be precooled to reach, as much as possible, the freezing temperature in the crystallizer) which brings liquid Freon 13 to +0°C at the inlet of boiler.

There is also available some cold in LNG under pressure which will go out also at −5°C; it may be utilized, in the same way, according to the need of the thermal balance of the desalination process.

An alternative for the liquefaction of n-butane coming from the crystallizer is the following one.

The vapours coming from the crystallizer are compressed with low compression ratio, as already effected in the plant of production of desalted water with injection of liquid n-butane. The compressed vapour is sent to a condenser where there is a direct contact between n-butane and a saline solution which has a freezing point a few degrees below 0(°C).

This may be the sea water treated in the plant or the more concentrated solution which is used in the crystallizer.

It circulates in the condenser in closed cycle by means of a pump.

The apparatus may be a filled type column or a plate column, provided that it is advantageous from a point of view of the energy consumption, it may be also a bubbling tower of the vapours of n-butane in the solution.

The condensation of the vapours, in whatever way it may be realized, brings heat to the saline solution.

It is necessary therefore to withdraw this heat from it.

This may be done:
By letting Freon 13 evaporate in exchangers where the saline solution circulates: exchangers which act as boiler for the generating plants.
By letting Freon 13, belonging to a refrigerating circuit, evaporate inside a suitable evaporator.

The centrifugal compressor, which compresses the vapours of the formed Freon 13, is operated by a portion of the energy obtained by the above mentioned generating plants.

The principle of using the heat which the freezer sends to its condenser in order to defrost the water ice in the melter remains unchanged. At the same time, for the freezer there is obtained a very low condensation temperature and therefore a very high efficiency.

The difference between the power developed in the generating plants and the power necessary for the freezer is what is needed for operating the compressor which draws n-butane from the crystallizer and sends it to the n-butane condenser.

The principle of avoiding low temperatures at the inlet of the boiler and at the inlet of the evaporator of the Freon 13 freezer, supply liquid, and this by means of parallel exchangers as above explained, remains unchanged also.

Figure 2:
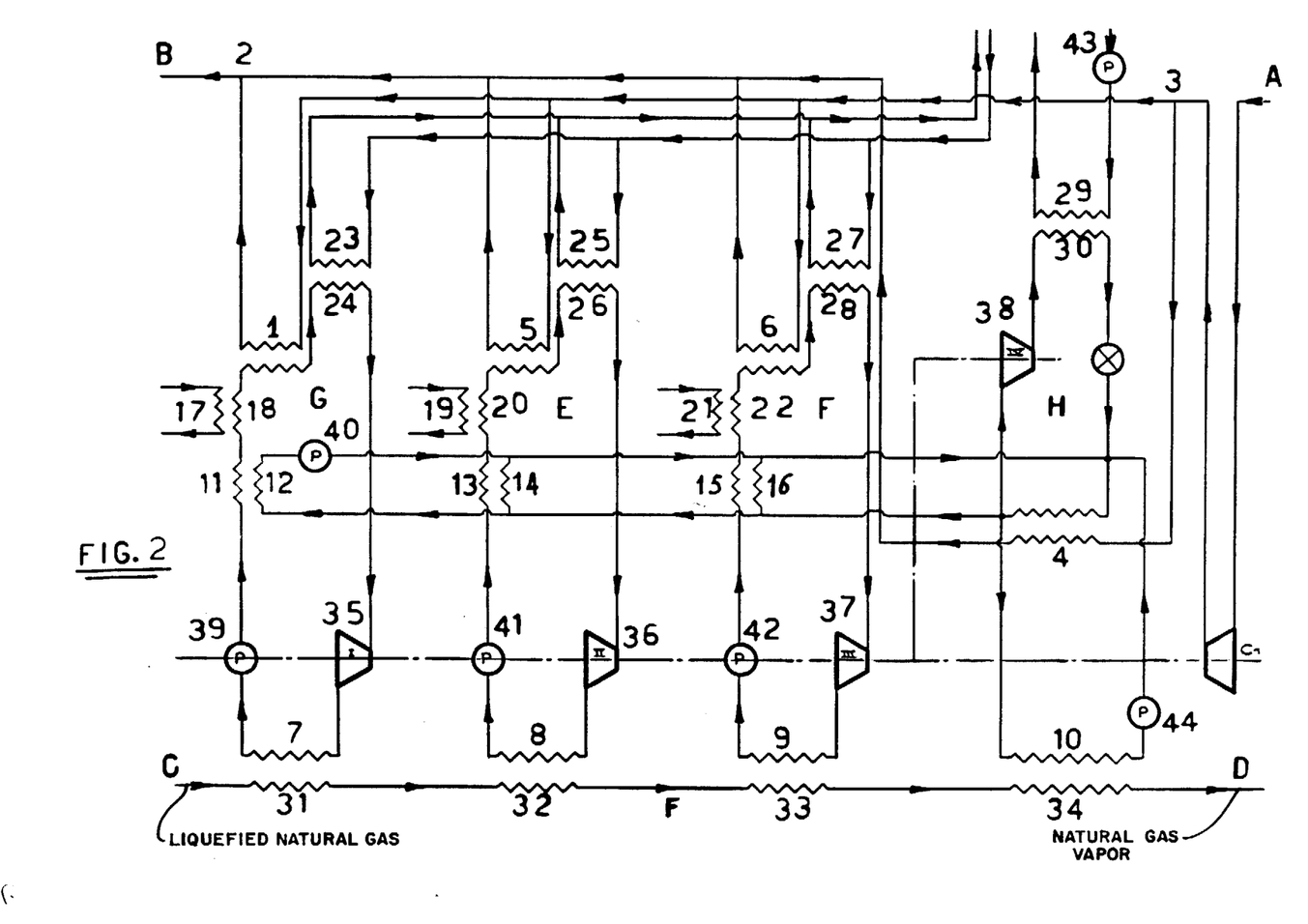
FIG. 2 is a flow diagram of a modified system of apparatus for carrying out my invention.

Now we describe the plant, shown schematically in FIG. 2, of the drawing by way of unrestrictive example.

The n-butane coming from the desalination plant enters A in the vapour phase, compressed in $C_1$, it exchanges thermally in 1 with the refrigerating liquid of a closed refrigerating circuit G, condenses and joins in 2 to the liquid stream of butane B which goes to the desalination plant.

In point 3 it divides as follows: a first portion of the compressed butane exchanges thermally in 4 with closed circuit H in parallel current and joins to the current of liquid butane; a second portion divides in three currents which exchange in points 1, 5, 6 respectively with circuits G, E, F, condense and join to the current of liquid butane. In the points 7, 8, 9 we have thermal exchanges among closed circuits and the hydrocarbon which transfers refrigerating units by passing from the liquid state to the gaseous state.

Point 10 is similar to 7, 8 and 9 but the exchanger is in parallel current.

Points 11–12, 13–14, 15–16 represent some zones of thermal exchange, in parallel current, respectively of the closed circuit G, E, F and H. Points 17–18, 19–20, 21–22 represent points of thermal exchange among the closed circuits and the water available in the plant having a suitable thermal content preferably sea water.

Points 23–24, 25–26 and 27–28 represent points of thermal exchange among closed circuits and other waters or the same waters available in the plant haivng a suitable thermal content.

Point 29–30 is a point of thermal exchange among the closed circuit H and the water available in the plant and preferably the one derived by partial or total melting of the formed ice.

Points 21, 32, 33 and 34 are points of thermal exchange of the hydrocarbon which transfer refrigeration units by passing from liquid to vapour phase.

Points 35, 36, 37 represent the energy production groups whereas 38 indicates the refrigerating system.

The pumps are indicated with reference numbers 39, 40, 41, 42, 43 and 44. The LNG enters C in liquid phase and comes out in D in vapour phase.

And now we will describe another variant having the aim of a best possible exploitation of the low temperature possessed by LNG (liquified natural gas).

By retaining the three energy generator plants it has been verified by calculation that a system for utilizing this energy much better than the one before described is the one which is described hereinafter.

According to another variant all of the above-mentioned energy is necessary for operating a single centrifugal or axial compressor of n-butane (or of suitable compound of the Freon type); therefore the refrigerating cycle is suppressed.

The above-mentioned compressor sucks the n-butane vapours from the crystallizer of the desalination plant and compresses them for the major part to the pressure necessary for obtaining their liquefaction in the melter of the plant. As not all the n-butane coming from the crystallizer is condensed in the melter, as shown by thermal balance considerations, it is necessary to condense a portion elsewhere.

This condensation may be effected in two different types of apparatuses:
There is the n-butane which, coming out from the centrifugal or axial compressor, is directed, rather than to the melter, to the boilers of the energy generating plants and there it condenses.
Afterwards there is the n-butane which coming out from the centrifugal compressor, is taken again by another one or more impellers of the same machine which bring it to a little higher pressure and at such a pressure to arrives at the final heater of LNG where it condenses.

Therefore there are in this example three apparatuses which condense the n-butane coming from the crystallizer:
1. The melter
2. The boilers of the energy generating plants
3. The final heater of LNG.

The n-butane condensed in these three types of apparatus is collected and injected into the crystallizer of the desalination plant in order to obtain the formation of ice crystals because of its evaporation. Another advantage of the present invention which represents also a noticeable simplification, is the following one: the circuit of Freon 13 in which pump 44 operates FIG. 2), is suppressed and the recovery of the cold contained in the feed liquid to the boilers (and the heating of said feeding up to a temperature near the one of boiling inside the boilers) is effected in another way, as hereinafter described and illustrated schematically in FIG. 3, of the drawings which is shown by way of an unrestrictive example.

Figure 3:
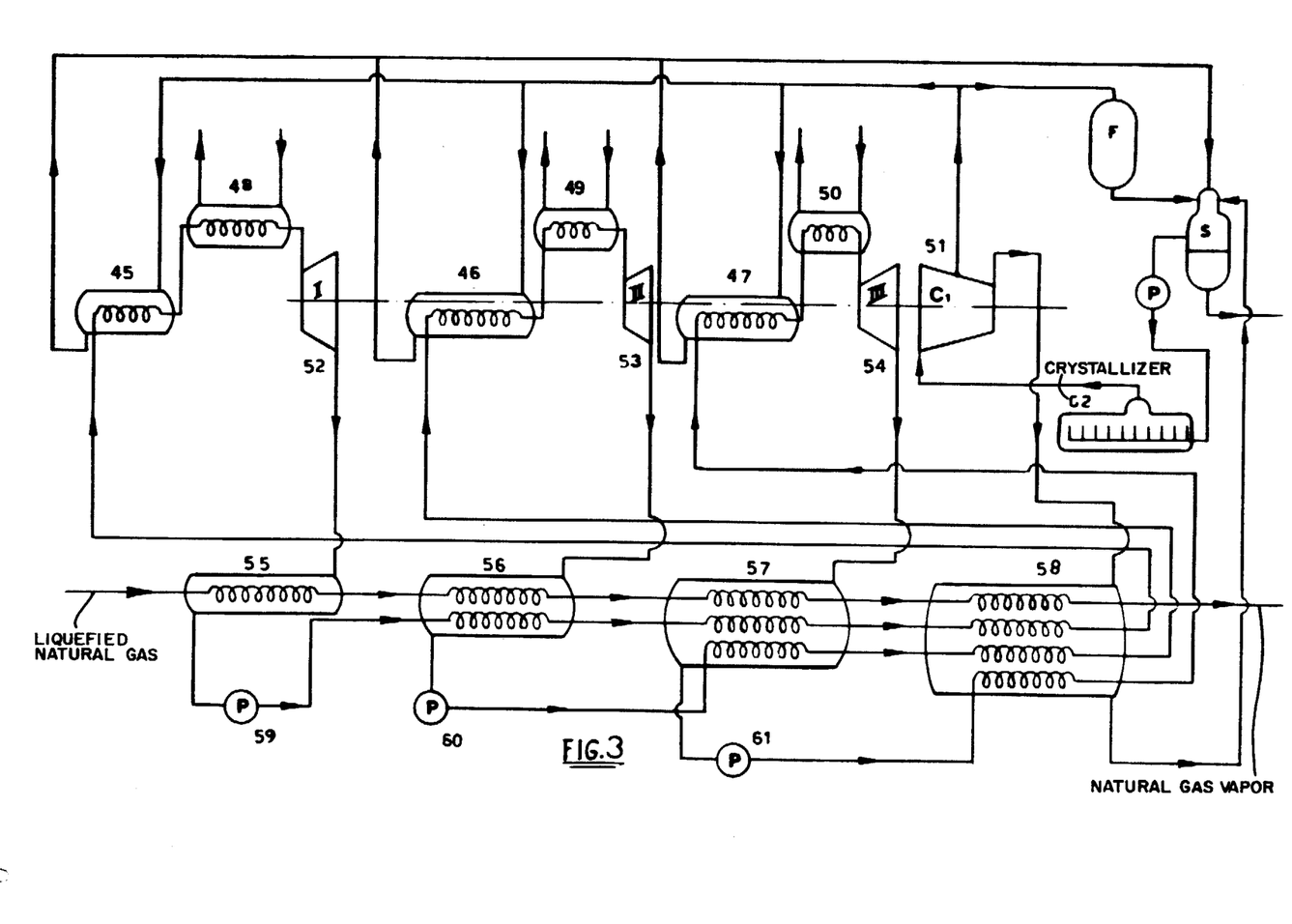
FIG. 3 is a flow diagram of a further modification of a system of apparatus for practicing my invention.

In said FIG. 3, by reference numerals 45, 46 and 47 we indicate the boilers of the energy generating plants, completed by 48, 49 and 50 which represent the vapour overheaters.

With the numbers I, II and III we indicate the turbines which form part of the three energy generating groups $C_1$ represents the compressor of the n-butane vapours. Reference numerals 55, 56, 57 are the three heaters of LNG (which enters the plant at 113°K) which at the same time act also as condensers of each of the 3 generating plants. 59 is the pump supply for the first plant which sends the liquid condensed in to 55 to heat subsequently in 56, 57 and 58 to the temperature suitable to be introduced into boiler 45. Similarly 60 is the supply pump for the 2nd plant which sends the liquid condensed in 57 and in 58 to the temperature suitable to be introduced into boiler 46.

And similarly 61 sends the liquid condensed from the third plant to heat in 58 to the temperature suitable to be introduced into boiler 47 of the third energy generating plant.

58 is the final heater of LNG which obviously heats also the condensates of the three energy generating plants and which afterwards are sent to the relative boilers.

$C_1$ draws the n-butane vapours from the crystallizer $C_2$, compresses it up to suitable pressure to be afterwards condensed either in the melter F or in the boilers of the three generating plants. The gas from said pressure is furtherly compressed as indicated in the scheme up to the pressure suitable for the heating of the fluids which run through 58, remaining always above 0°C.

Melter F which performs the known function in the desalination plant, produces a mixture of water and of liquid n-butane which are guided, by decantation, in separator S.

To this separator arrive also the condensates of n-butane coming from the boilers of the three generating groups as well as the condensate of n-butane with water coming from 58.

The water separated at the bottom of separator S, is the finished product which goes, as known, to the exchangers of the desalination plants.

The lighter liquid n-butane which stratifies on the upper part of the water is sucked by the pump to be sent to the crystallizer, whose vapours enter again in the described cycle.

As it may be noted from the same scheme, it is kept unchanged the concept of heating progressively LNG in four subsequent exchangers (if there are three energy generating plants); the first, second and third of which are the condensers of the first, second and third plants, respectively.

The fourth exchanger is the final heater of LNG. Now it is easy to agree on the fact that the fluid operating in the first plant, when it comes out from the condenser, is at a very low temperature, lower than the one of condensation, because the condenser is run in countercurrent as to a LNG.

Such a so cold liquid has to be suitably heated before being introduced into a boiler. In the particular case of these boilers it is important that no part of them is at a temperature lower than 0°C, in order to exclude the formation of water ice on the heat transfer surfaces.

In order to obtain this aim, the heating of the feeds occurs in a parallel way to that of LNG:
The feed of the first plant is heated in the condenser of the second plant, afterwards in the condenser of the third plant, finally in the final heater of LNG;
The feed of the second plant is heated in the condenser of the third plant and afterwards in the final heater of LNG;
The feed of the third plant is heated in the final heater.

In this way and because of the slightly higher pressure which has been reached to the n-butane vapours, by means of the last impellers of the centrifugal or axial compressor $C_1$, all the feeds arrive at the boilers at a temperature a little higher than 0°C.

Likewise the LNG comes out at the same temperature. This occurs, even more so, for the mixture of n-butane and water which comes out from the final heater after having transferred heat to the cold currents.

The final heater of LNG treats only a part of n-butane coming from the crystallizer, saturated with steam. It requires a particular construction, in case duplicated for a part or for the entire apparatus in order to allow the continuity of the running by effecting the alternate defrosting of the one or of the other apparatus.

From calculations, an efficiency of the above mentioned scheme much higher than those previously described has resulted. This depends essentially in the suppression of the Freon 13 refrigerant cycle which is an indirect cycle, replaced advantageously by the direct cycle of n-butane, being itself a refrigerating cycle which however operates with a temperature pump much lower than the one realized in the Freon 13 cycle.

When the generating plants are two, instead of three, as in the scheme, (and it is to be noticed that it has been already stated that the number of plants has no importance as to the particular application, what is obvious, on the other hand), it has been calculated that the weight of n-butane which is condensed is about:

760 ($t/h$) when there are available 80,000 ($kp/h$) of LNG, a figure corresponding to about $10^9$ Nm$^3$/year of natural gas injected in the methane pipe line and bringing said LNG to the pressure of 60 (ata), from about 113°k to about +275°k.

From this data, by knowing the efficiency with which the cold is used in the desalination plant, results the fresh water in ton/days, which is possible to produce.

As noted above, we started from the concept of the heat multiplication, it is interesting to calculate the result which would be obtained with the simple exchange of heat between n-butane and LNG (without any heat multiplication).

With the same extreme temperature of LNG are given to this one (and therefore subtracted to n-butane) 214 (Cal/Kp).

To this exchanged heat corresponds the liquefaction of about $214/91.8 = 2.33$ (Kp) of n-butane.

And for the same 80,000 (Kp$h$) of LNG there results the production of about 186.5 $t/h$ of n-butane.

From the installation, there results therefore the multiplication ratio $760/186.5 = 4.07$.

By making three or more generating plants, this ratio increases; however it increases more and more slowly, whereas the complexity and the cost of the plant increases.

It is obvious that the choice of the number of the generating plants has to be made on the basis of various considerations.

I claim:

1. In a process for producing desalted water wherein liquified natural gas is converted to the vapor state and refrigeration units are released therefrom and transferred to a higher hydrocarbon in the vapor state which is converted to the liquid state and then delivers to water to be desalinated and refrigeration units necessary for desalination, the improvement which comprises transferring said refrigeration units from the liquified natural gas to said higher hydrocarbon by means of at least one closed energy fluid circuit which includes a heat exchanger for the absorption by said enerby fluid of refrigeration units from the liquified natural gas, a boiler for the absorption of heat from said higher hydrocarbon and the attendant delivery of refrigeration units thereto by said energy fluid, a superheater for delivering heat to said energy fluid, and a turbine adapted to transfer energy from said heater energy fluid to a compressor.

2. Process for producing desalted water as claimed in claim 1 wheein the higher hydrocarbon is butane.

3. Process for producing desalted water, as claimed in claim 1, wherein a plurality of closed circuits transfer refrigeration units from liquified natural gas to a higher hydrocarbon and also exchange thermally among themselves.

4. Process as claimed in claim 3 wherein the thermal exchange between said closed circuits is realized in parallel current.

5. Process as claimed in claim 4, wherein said water is obtained for melting of the ice produced by the plant.

6. Process as in claim 3, wherein the closed circuits also exchange thermally with water available in the plant.

7. Process as claimed in claim 6, wherein the thermal exchange with water is in countercurrent.

8. Process for producing desalted water as claimed in claim 1, wherein in addition to the transfer of refrigeration units from liquified natural gas to a higher hydrocarbon through a closed energy refrigerant fluid circuit, a simple exchange of refrigeration units from the liquified natural gas to the higher hydrocarbon is effected through a heat exchanger so that the total quantity of refrigeration units delivered to the higher hydrocarbons is a multiple of that delivered by simple transfer thereto from the liquified natural gas.

9. Process for providing desalted water as claimed in claim 8, wherein a plurality of closed energy fluid circuits transferring refrigeration units from liquified natural gas to the higher hydrocarbon are connected in heat exchange relationship with each other and with said heat exchanger in series so that the temperature of the liquified natural gas is progressively raised to a temperature near the ambient temperature.

10. Process for providing desalted water as claimed in claim 9, wherein the turbines contained in all of said closed energy fluid circuits are connected to a shaft driving a compressor for said higher hydrocarbon.

* * * * *

UNITED STATES PATENT AND TRADEMARK OFFICE
CERTIFICATE OF CORRECTION

PATENT NO. : 3,892,103
DATED : July 1, 1975
INVENTOR(S) : Attilio Antonelli

It is certified that error appears in the above-identified patent and that said Letters Patent are hereby corrected as shown below:

Column 1, line 52, change "in" to --of--.

Column 4, line 41, after "hydrocarbon" insert --higher--.

line 50, change "member" to --number--.

Column 6, line 58, change the line to read:

--the boilers and LNG   $8.31 \cdot 10^6$--.

Column 8, line 11, change "exchanger" to --exchange--.

line 27, change "21" to read --31--.

Column 9, line 13, insert a parenthesis "(" before --Fig.--.

line 16, change "feeding" to --feed--.

line 26, insert a period --(.)-- at the end of the line.

UNITED STATES PATENT AND TRADEMARK OFFICE
CERTIFICATE OF CORRECTION

PATENT NO. : 3,892,103
DATED : July 1, 1975
INVENTOR(S) : Attilio Antonelli

It is certified that error appears in the above-identified patent and that said Letters Patent are hereby corrected as shown below:

Column 9, line 31, change "pump supply" to read --supply pump--.

line 32, before "55" delete --to--.

Column 10, line 13, delete "so".

line 30, after "reached" change "to" to --by--.

Column 11, line 11, "(Kph)" should read --(Kp/h)--.

line 28, change "and" to --the--.

lines 33-34, correct "enerby" to read --energy--.

Column 12, line 2, correct spelling of "wherein".

line 21, delete "refrigerant".

Signed and Sealed this twenty-fourth Day of February 1976

[SEAL]

Attest:

RUTH C. MASON
*Attesting Officer*

C. MARSHALL DANN
*Commissioner of Patents and Trademarks*